United States Patent
Schunk et al.

(10) Patent No.: US 6,872,766 B2
(45) Date of Patent: Mar. 29, 2005

(54) ULTRAVIOLET LIGHT FILTER ELEMENT

(75) Inventors: Timothy C. Schunk, Livonia, NY (US); Kurt M. Schroeder, Spencerport, NY (US); Charles H. Appell, Rochester, NY (US); Daniel T. Linehan, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 189 days.

(21) Appl. No.: 10/150,634

(22) Filed: May 17, 2002

(65) Prior Publication Data

US 2003/0080326 A1 May 1, 2003

Related U.S. Application Data

(60) Provisional application No. 60/326,853, filed on Oct. 3, 2001.

(51) Int. Cl.[7] .................................................. C08K 5/07

(52) U.S. Cl. ..................... 524/357; 524/359; 524/363; 524/91; 524/100; 524/195; 106/168.01; 106/171.1; 106/170.47; 106/170.1; 428/1.1; 428/1.5

(58) Field of Search ................................ 524/357, 359, 524/363, 91, 100, 195, 81; 106/168.01, 171.1, 170.47, 170.1; 428/1.1, 1.5

(56) References Cited

U.S. PATENT DOCUMENTS

| | | | |
|---|---|---|---|
| 3,981,884 A | * 9/1976 | Wang et al. | 548/261 |
| 4,043,639 A | 8/1977 | Matsuyama et al. | |
| 4,387,089 A | 6/1983 | De Polo | |
| 4,619,956 A | 10/1986 | Susi | |
| 4,839,405 A | 6/1989 | Speelman et al. | |
| 5,744,127 A | * 4/1998 | Giuseppe et al. | 424/59 |
| 5,783,173 A | 7/1998 | Bonda et al. | |
| 5,788,954 A | 8/1998 | Bonda et al. | |
| 5,806,834 A | 9/1998 | Yoshida | |
| 5,849,273 A | 12/1998 | Bonda et al. | |
| 5,993,789 A | 11/1999 | Bonda et al. | |
| 6,123,928 A | * 9/2000 | Sovak et al. | 424/59 |
| 6,129,909 A | 10/2000 | Bonda et al. | |
| 6,531,117 B2 | * 3/2003 | Heger et al. | 424/59 |
| 2002/0099094 A1 | * 7/2002 | Anderson | 514/561 |

FOREIGN PATENT DOCUMENTS

| | | | |
|---|---|---|---|
| EP | 0 843 996 | | 5/1998 |
| JP | 4-213348 | | 8/1992 |
| JP | 04213348 | * | 8/1992 |
| JP | 07041660 | * | 2/1995 |

OTHER PUBLICATIONS

Abstract, JP 04213348, Nishikawa et al., Aug. 1992.*
Abstact, JP 07041660, Nakamura et al., Feb. 1995.*
U.S. Appl. No. 10/150,836; filed May 17, 2001; titled "Stabilizers System For Polymer Components Of Displays"; of Timothy C. Schunk.
S.–K. Wu, G.–S. Dai, L.–S. Liu and J.–K. Chang; "A Study of the Photo–stabilizing Behaviors of β–Diketones"; Polymer Degradation and Stability; 16; (1986); pp. 169–186.

* cited by examiner

*Primary Examiner*—David J. Buttner
*Assistant Examiner*—Christopher Keehan
(74) *Attorney, Agent, or Firm*—Andrew J. Anderson

(57) ABSTRACT

Ultraviolet light absorbing polymer film, coating, or molded article UV filter elements are described which comprise a polymer phase having molecularly dispersed therein a) a first ultraviolet absorbing dibenzoylmethane compound of formula (I)

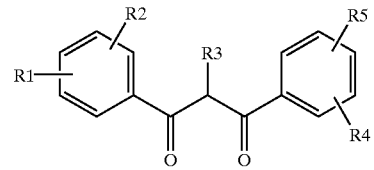

where R1 through R5 are each independently hydrogen, halogen, nitro, or hydroyxl, or further substituted or unsubstituted alkyl, alkenyl, aryl, alkoxy, acyloxy, ester, carboxyl, alkyl thio, aryl thio, alkyl amine, aryl amine, alkyl nitrile, aryl nitrile, arylsulfonyl, or 5–6 member heterocylce ring groups, and b) a second ultraviolet light absorbing compound which absorbs ultraviolet light at a wavelength for which the first compound is deficient at absorbing. In particular embodiments, the second ultraviolet light absorbing compound may comprise a hydroxyphenyl-s-triazine, hydroxyphenylbenzotriazole, formamidine, benzoxazinone, or benzophenone compound. In a specific embodiment of the invention, the above UV absorbing compounds are employed in cellulose acetate film for the fabrication of a protective film for polarizers for use in display applications.

20 Claims, 1 Drawing Sheet

ULTRAVIOLET LIGHT FILTER ELEMENT

CROSS REFERENCE TO RELATED APPLICATIONS

Reference is made to and priority claimed from U.S. Provisional Application Ser. No. 60/326,853 filed Oct. 3, 2001, the disclosure of which is incorporated by reference herein.

Cross-reference is made to copending, commonly assigned U.S. Ser. No. 10/150,836, filed concurrently herewith, which is based upon U.S. Provisional Application Ser. No. 60/326,854 filed Oct. 3, 2001, the disclosures of which are incorporated by reference herein.

FIELD OF THE INVENTION

The present invention relates to a UV filter element comprising a polymer phase containing at least two ultraviolet light absorbing compounds, one of which is a derivative of dibenzoylmethane and one other of which absorbs UV light at a wavelength at which the dibenzoylmethane compound is deficient at absorbing UV light. In a particular embodiment, the invention relates to the use of particular UV absorbing compounds in cellulose acetate film for the fabrication of polarizers for use in display applications.

BACKGROUND OF THE INVENTION

An ultraviolet light (UV) filter element is employed as a sharp cut filter to transmit visible light while blocking UV light in either an optical device or to protect an underlying element. Such applications include color correction of an image during optical recording (e.g., in either silver halide or digital photography), color correction in a display device (e.g., backlit or reflective liquid crystal displays or emissive displays, OLED), or maintenance of appearance and function of a multicomponent device. Protective functions of such an UV filter element may be provided in the form of protective polymeric overcoats, interlayers, or cast or molded films or other articles used to stabilize accompanying materials against the degradation of optical and mechanical properties induced by UV light exposure (e.g., degradation of liquid crystal components in an LCD display).

An UV filter element is required to thoroughly transmit light of longer than a specified wavelength, while thoroughly blocking light shorter than that wavelength. Optimum performance is provided by a very sharp transition between these wavelengths (i.e., sharp cut). In addition, light transmitted in the visible region should be of neutral hue as perceived by the human eye (e.g., as measured according to the CIE, International Commission on Illumination). The functional performance of the UV filter element should remain as constant as possible during the normal lifetime of the application and under the standard environment of use. That is, in addition to stable mechanical properties, the UV filter element should not significantly lose its ability to transmit visible light (discolor) or block UV light (fade) under normal use in its intended application.

Various classes of UV absorbing compounds are known, and many have been suggested for use in UV filter elements. U.S. Pat. No. 4,043,639, e.g., suggests the use of salicyclic acid esters, hydroxybenzophenone, benzotriazole and their derivatives as UV light-absorbing agents in cellulose triacetate films bonded to a polarizing film for the protection of the liquid crystal components from degradation in a LCD display. The disclosure includes the description of improved resistance to high temperature and humidity of the device. Many classes of UV absorbing compounds previously disclosed for use in polymeric UV filter elements, however, have various problems associated therewith, especially with regard to providing a desired sharp cut at approximately 390 to 400 nm while also providing complete protection throughout the UV range. U.S. Pat. No. 5,806,834 discloses the use of aminobutadiene derivatives to provide a sharp cut UV filter in the 400 nm region with reduced yellow discoloration of the filter as results from high loading levels of benzotriazole or benzophenone derivatives. The formulations described include a second UV absorbing compound added to the polymer in order to absorb light of shorter wavelengths that cannot be absorbed by the primary aminobutadiene compound. Compounds such as benzotriazole, salicylate, benzophenone and their derivatives are described as fulfilling this function. Aminobutadiene compounds, however suffer from thermal instability.

Additionally, use of various compounds as suggested in the prior art still may not provide as sharp a cut-off of absorption between the ultraviolet and visible spectrum as may be desired. It would accordingly be desirable to provide an UV filter element that provides a very sharp cut in transmission between the UV and visible light spectral regions, while also providing effective UV absorption throughout the UV range, as well as good thermal stability.

SUMMARY OF THE INVENTION

In accordance with the invention, ultraviolet light absorbing polymer film, coating, or molded article UV filter elements are described which comprise a polymer phase having molecularly dispersed therein a) a first ultraviolet absorbing dibenzoylmethane compound of formula (I)

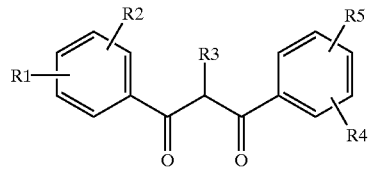

where R1 through R5 are each independently hydrogen, halogen, nitro, or hydroyxl, or further substituted or unsubstituted alkyl, alkenyl, aryl, alkoxy, acyloxy, ester, carboxyl, alkyl thio, aryl thio, alkyl amine, aryl amine, alkyl nitrile, aryl nitrile, arylsulfonyl, or 5–6 member heterocylce ring groups, and b) a second ultraviolet light absorbing compound which absorbs ultraviolet light at a wavelength for which the first compound is deficient at absorbing. In particular embodiments, the second ultraviolet light absorbing compound may comprise a hydroxyphenyl-s-triazine, hydroxyphenylbenzotriazole, formamidine, benzophenone, or benzoxazinone compound. In addition, in further embodiments of the polymer UV filter element of the invention, enhanced durability to the action of light, heat, moisture, and oxygen in terms of UV light blockage, visible spectrum color, and dimensional stability may be imparted by chemical stabilizers such as hindered amine light stabilizers, hindered phenols, acid scavengers, and UV stabilizers. In a specific embodiment of the invention, the use of the above UV absorbing compounds and stabilizers may be employed in cellulose acetate film for the fabrication of polarizers for use in display applications.

DETAILED DESCRIPTION OF THE INVENTION

Figure 1:
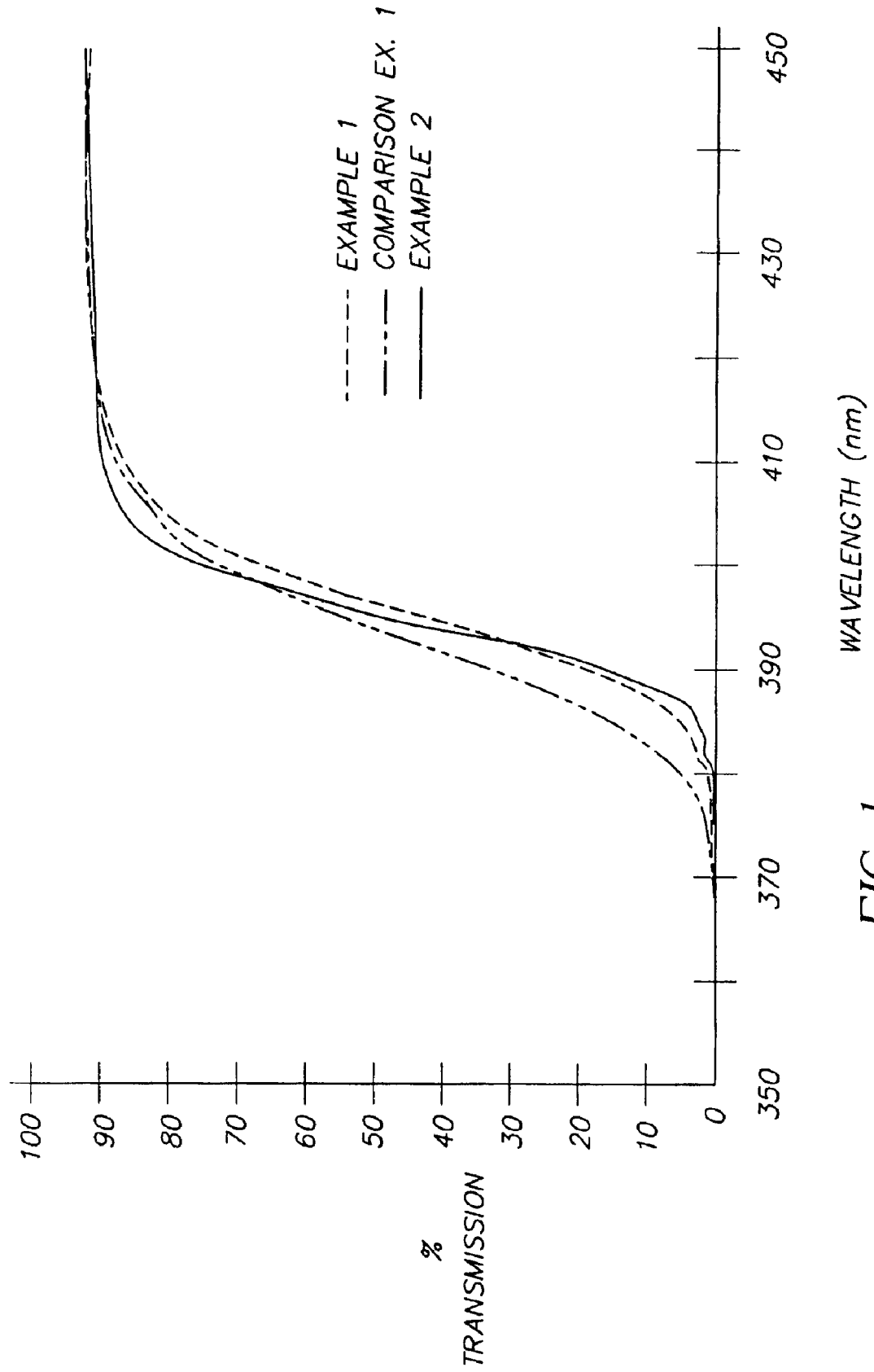
FIG. 1 is a graph showing transmittance curves of light in a wavelength region of 350 to 450 nm of UV filter elements obtained in Examples 1 and 2 and Comparison Example 1.

The present invention describes the use of multiple UV absorbing agent compounds molecularly dispersed in a polymeric phase of a polymeric film, coating or molded article, where at least one of the UV absorbing compounds comprises a dibenzoylmethane derivative. Dibenzoylmethane derivative compounds of the type employed in the present invention are themselves known, and have been previously described primarily for use in oil emulsions to block UV light in sunscreen compositions, e.g., in U.S. Pat. Nos. 4,387,089; 5,783,173; 5,849,273; 5,788,954; 5,993,789; and 6,129,909. Additionally, Wu et al. "A Study of the Photo-stabilizing Behaviors of β-Diketones," *Polym. Degrad. Stab.*, 16 (1986) 169–186, discloses the use of dibenzoylmethane derivatives as UV exposure stabilizers for viscosity retention of polybutadiene solutions. Further, Japanese Kokai JP 04213348 A2 discloses the use of a dibenzoylmethane derivative to improve the weatherability of an acrylic resin film by incorporating the UV absorber inside of cross-linked polymer particles that are dispersed in the resin film to reduce migration out of the film.

In Formula I, each of R1 through R5 independently represents hydrogen, halogen, nitro, or hydroyxl, or further substituted or unsubstituted alkyl, alkenyl, aryl, alkoxy, acyloxy, ester, carboxy, alkyl thio, aryl thio, alkyl amine, aryl amine, alkyl nitrile, aryl nitrile, arylsulfonyl, or 5–6 member heterocycle ring groups. Preferably, each of such groups comprises 20 or fewer carbon atoms. Further preferably, R1 through R5 of Formula I are positioned in accordance with Formula I-A:

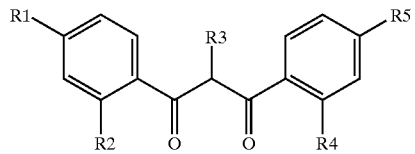

Particularly preferred are compounds of Formula I-A where R1 and R5 represent alkyl or alkoxy groups of from 1–6 carbon atoms and R2 through R4 represent hydrogen atoms.

Representative compounds of Formula (I) which may be employed in accordance with the invention include the following:
(I-1): 4-(1,1-dimethylethyl)-4'-methoxydibenzoylmethane (PARSOL 1789)
(I-2): 4-isopropyl dibenzoylmethane (EUSOLEX 8020)
(I-3): dibenzoylmethane (RHODIASTAB 83)

While the present inventors have observed that dibenzoylmethane derivatives of Formula I have been found to advantageously provide a sharp cut off in absorption between the UV and visible light ranges, such compounds have also been observed to provide less than desired absorption over substantial portions of the UV spectrum. In particular, while the ultraviolet absorber of the Formula I shows a steeply rising transmittance curve at a wavelength of approx. 390 to 400 nm, the ultraviolet absorber cannot sufficiently absorb light in a portion of the ultraviolet region (i.e., in the region of not longer than 350 nm, generally approx. 250 nm to approx. 350 nm, especially in the region in the vicinity of 300 nm).

In order to provide an UV filter element which is capable of providing both a sharp cut off in absorption between the UV and visible light spectral regions, as well as increased protection across more of the UV spectrum, a second UV absorbing compound is employed in combination with the primary dibenzoylmethane compound, which second ultraviolet absorbing compound is selected to provide absorption of light in a portion of the ultraviolet region for which the first absorbing compound is deficient, while transmitting visible light (generally in a wavelength region of 400 to 750 nm). In accordance with the invention, in order to provide good optical characteristics for the UV filter element, both the first and second compounds are molecularly dispersed in a polymeric phase of the element.

In accordance with specific embodiments of the invention, the second ultraviolet light absorbing compound preferably comprises a hydroxyphenyl-s-triazine, hydroxyphenylbenzotriazole, formamidine, benzophenone, or benzoxazinone compound. Additional possible UV absorbers which may be employed include salicylate compounds, such as 4-t-butylphenylsalicylate; and [2,2'thiobis-(4-t-octylphenolate)]n-butylamine nickel(II). Such ultraviolet light absorbing compounds are themselves known, and have been described for use in various polymeric elements. Preferred are hydroxyphenyl-s-triazine and hydroxyphenylbenzotriazole compounds.

Hydroxyphenyl-s-triazine compounds which may be used as the second UV absorbing compound, e.g., may be a derivative of tris-aryl-s-triazine compounds as described in U.S. Pat. No. 4,619,956, the disclosure of which is incorporated by reference. Such compounds may be represented by Formula II:

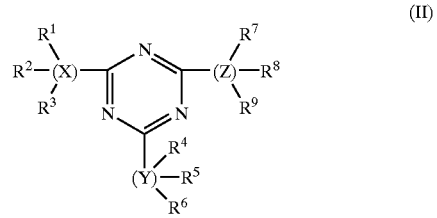

wherein X, Y and Z are each aromatic, carbocylic radicals of less than three 6-membered rings, and at least one of X, Y and Z is substituted by a hydroxy group ortho to the point of attachment to the triazine ring; and each of $R^1$ through $R^9$ is selected from the group consisting of hydrogen, hydroxy, alkyl, alkoxy, sulfonic, carboxy, halo, haloalkyl and acylamino. Particularly preferred are hydroxyphenyl-s-triazines of the formula II-A:

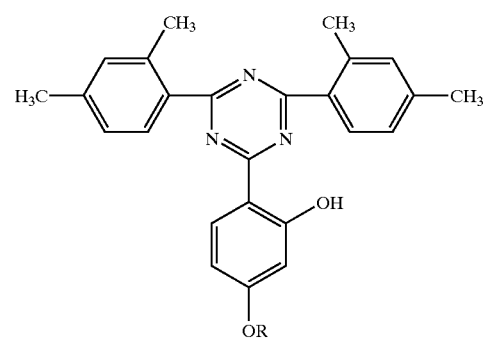

wherein R is hydrogen or alkyl of 1–18 carbon atoms.

Hydroxyphenylbenzotriazole compounds which may be used as the second UV absorbing compound, e.g., may be a derivative of compounds represented by Formula III:

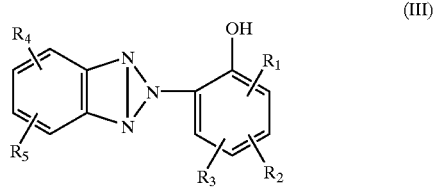

wherein $R_1$ through $R_5$ may be independently hydrogen, halogen, nitro, hydroxy, or further substituted or unsubstituted alkyl, alkenyl, aryl, alkoxy, acyloxy, aryloxy, alkylthio, mono or dialkyl amino, acyl amino, or heterocyclic groups. Specific examples of benzotriazole compounds which may be used in accordance with the invention include 2-(2'-hydroxy-3'-t-butyl-5'-methylphenyl)-5-chlorobenzotriazole; 2-(2'-hydroxy-3',5'-di-t-amylphenyl)benzotriazole; octyl 5-tert-butyl-3-(5-chloro-2H-benzotriazole-2-yl)-4-hydroxybenzenepropionate; 2-(hydroxy-5-t-octylphenyl) benzotriazole; 2-(2'-hydroxy-5'-methylphenyl) benzotriazole; 2-(2'-hydroxy-3'-dodecyl-5'-methylphenyl) benzotriazole; and 2-(2'-hydroxy-3',5'-di-t-butylphenyl)-5-chlorobenzotriazole.

Formamidine compounds which may be used as the second UV absorbing compound, e.g., may be a formamidine compound as described in U.S. Pat. No. 4,839,405, the disclosure of which is incorporated by reference. Such compounds may be represented by Formula IV or Formula V:

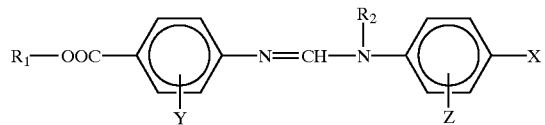

(IV)

wherein $R_1$ is an alkyl group containing 1 to about 5 carbon atoms; Y is a H, OH, Cl or an alkoxy group; $R_2$ is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen;

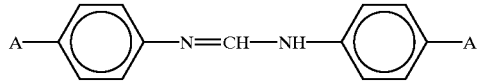

(V)

wherein A is —COOR, —COOH, —CONR'R", —NR'COR, —CN, or a phenyl group; and wherein R is an alkyl group of from 1 to about 8 carbon atoms; R' and R" are each independently hydrogen or lower alkyl groups of from 1 to about 4 carbon atoms. Specific examples of formamidine compounds which may be used in accordance with the invention include those described in U.S. Pat. No. 4,839,405, and specifically 4-[[(methylphenylamino)methylene] amino]-, ethyl ester.

Benzophenone compounds which may be used as the second UV absorbing compound, e.g., may include 2,2'-dihydroxy-4,4'dimethoxybenzophenone, 2-hydroxy-4-methoxybenzophenone and 2-hydroxy-4-n-dodecyloxybenzophenone.

The present invention provides an ultraviolet-absorbing polymer film, coating or molded article that is capable of transmitting thoroughly light in a wavelength region of longer than 400 nm, and absorbing thoroughly light in a wavelength region of not longer than 400 nm. In preferred embodiments of the invention, the first and second UV absorbing compounds are selected and employed in a polymer film to provide a transmittance at a wavelength of 380 nm of not more than 10% (more preferably not more than 5%) and at 390 nm of not more than 25% (more preferably not more than 20%), and a transmittance at a wavelength of 400 nm of not less than 55% (more preferably not less than 60%) and at 420 nm of not less than 85% (more preferably not less than 90%). Further, the polymer film preferably shows transmittance at 370 nm of not more than 3%, especially not more than 1%. In more detail, the use of a compound of formula (I) provides a transmittance curve having a steeply rising position (point) at wavelengths between approx. 390 to 400 nm, while the use of a second ultraviolet absorbing compound provides absorption of light in a portion of the ultraviolet region in which the compound of the formula (I) is relatively deficient in absorption.

The UV filter element is advantageously employed as a protective film of a polarizing sheet, the polarizing sheet comprising a polarizing plate and the protective film provided on one side or both sides of the polarizing plate. Further, the filter element can be suitably employed for a sharp cut filter for ultraviolet (e.g., polarizing glasses, UV-cut filter). Further, the filter element of the invention can be utilized, in combination with other optical filters, for a sharp cut filter, a color correction filter for taking color photography, a color correction filter for color print or a filter for special use (e.g., separation filter, masking filter for photomechanical process, visual sensitivity filter).

Examples of polymers employable for the polymer phase of the filter elements of the invention include polyesters (e.g., polyethylene terephthalate and polyethylene-2,6-naphthalate); cellulose esters (e.g., cellulose diacetate, cellulose triacetate, cellulose acetate propionate, and cellulose acetate butyrate); polyolefins (e.g., polypropylene and polyethylene); polymers derived from vinyl chloride (e.g., polyvinyl chloride and vinyl chloride/vinyl acetate copolymer); acrylic resins (e.g., polymethyl methacrylate); polycarbonate esters (e.g., polycarbonate); norbornene resins; and water soluble resins (e.g., polyvinyl alcohol, gelatin).

In a particularly preferred embodiment, the UV filter element of the invention is in the form of a polymer film wherein the polymer is a cellulose ester such as a cellulose acetate, particularly cellulose triacetate. The UV filter element in such embodiment may be advantageously employed as a protective film of a polarizing sheet, the polarizing sheet comprising a polarizing plate and the protective film provided on one side or both sides of the polarizing plate. Further, as cellulose triacetate, the known materials can be employed. The acetyl value of cellulose triacetate preferably is in the range of 35% to 70%, especially in the range of 55% to 65%. The weight average molecular weight of cellulose acetate preferably is in the range of 70,000 to 200,000, especially 80,000 to 190,000. The polydispersity index (weight average divided by number average molecular weight) of cellulose acetate is in the range of 2 to 7, especially 2.5 to 4. Cellulose acetate may be obtained from cellulose starting materials derived from either wood pulp or cotton linters. Cellulose acetate may be esterified using a fatty acid such as propionic acid or butyric acid so long as the acetyl value satisfies the desired range.

Cellulose acetate film generally contains a plasticizer. Examples of the plasticizers include phosphate esters such as triphenyl phosphate, biphenylyl diphenyl phosphate, tricresyl phosphate, cresyl diphenyl phosphate, octyl diphenyl phosphate, trioctyl phosphate, and tributyl phosphate; and phthalate esters such as diethyl phthalate, dimethoxyethyl phthalate, dimethyl phthalate, and dioctyl phthalate. Preferable examples of glycolic acid esters are triacetin, tributyrin, butyl phthalyl butyl glycolate, ethyl phthalyl ethyl glycolate, and methyl phthalyl ethyl glycolate. Two or more plasticizers shown above may be combined. The plasticizer is preferably contained in the film in an amount of not more than 20 weight %, especially of 5% to 15 weight %. Films prepared from polymers other than cellulose triacetate may also contain appropriately the above plasticizer.

Both of the ultraviolet absorber of the formula (I) and other ultraviolet absorber (the other of two or more ultraviolet absorbers) is generally contained in the polymer in an amount of 0.01 to 20 weight parts based on 100 weight parts of the polymer containing no ultraviolet absorber, and preferably contained in an amount of 0.01 to 10 weight parts, especially in an amount of 0.05 to 2 weight parts.

A ratio of the ultraviolet absorber of the formula (I) and other ultraviolet absorber (the other of two or more ultraviolet absorbers) generally is in the range of 1:30 to 5:1 by weight (absorber of the formula (I):other absorber), and preferably in the range of 1:20 to 2:1. The sharp cut position (wavelength value) in the transmittance curve can be shifted by variation of the amount of the ultraviolet absorber added.

The filter elements of the invention may contain particles of an inorganic or organic compound to provide surface lubrication. Examples of the inorganic compound include silicon dioxide, titanium dioxide, aluminum oxide, zirconium oxide, calcium carbonate, talc, clay, calcined kaolin, calcined calcium silicate, hydrate calcium silicate, aluminum silicate, magnesium silicate, and calcium phosphate. Preferred are silicon dioxide, titanium dioxide, and zirconium oxide, and especially silicon dioxide. Examples of the organic compound (polymer) include silicone resin, fluororesin and acrylic resin. Preferred is acrylic resin.

UV filter elements in accordance with the invention preferably are in the form of a polymer film. The polymer film is preferably prepared by utilizing a solvent casting method. In more detail, the solvent casting method comprises the steps of: casting the polymer solution fed from a slit of a solution feeding device (die) on a support and drying the cast layer to form a film. In a large-scale production, the method can be conducted, for example, by the steps of casting a polymer solution (e.g., a dope of cellulose triacetate) on a continuously moving band conveyor (e.g., endless belt) or a continuously rotating drum, and then vaporizing the solvent of the cast layer. In a small-scale production, the method can be conducted, for example, by the steps of casting a polymer solution fed from a slit of a solution feeding device on a fixed support having a regular size such as a metal plate or glass plate by moving the device, and then vaporizing the solvent of the cast layer.

Any support can be employed in the solvent casting method, so long as the support has property that a film formed thereon can be peeled therefrom. Supports other than metal and glass plates (e.g., plastic film) are employable, so long as the supports have the above property. Any die can be employed, so long as it can feed a solution at a uniform rate. Further, as methods for feeding the solution to the die, a method using a pump to feed the solution at a uniform rate can be employed. In a small-scale production, a die capable of holding the solution in an appropriate amount can be utilized.

Polymer employed in the solvent casting method is required to be capable of dissolving in a solvent. Further a film formed of the polymer is generally required to have high transparency and to have little optical anisotropy for application in optical products. Furthermore, the polymer preferably has compatibility with the absorbers. As the polymer employed in the solvent casting method, preferred is cellulose triacetate. However, other polymers can be employed so long as they satisfy the above conditions.

As a method for the formation of polymer UV filter elements other than the solvent casting method, there can be mentioned the known extrusion molding method comprising the steps of mixing the polymer and the absorbers with melting, and extruding the mixture. The method is generally applied to polymers that cannot utilize the solvent casting method.

A process for the preparation of an UV filter element in the form of an optical polymer film in accordance with preferred embodiments of the invention is explained in detail referring to a cellulose triacetate film. In a mixing vessel, a solvent, cellulose triacetate and a plasticizer are placed, and cellulose acetate is dissolved by stirring (under heating, if desired under pressure) to prepare a dope. In another mixing vessel, a solvent and two ultraviolet absorbers are placed, and the absorbers are dissolved by stirring. In the case that particles to improve surface lubrication are added, the particles may be placed in the resultant absorber containing solution and the mixture is dispersed using a dispersing machine to prepare a dispersion. An appropriate amount of the absorber containing solution is fed to the vessel holding the dope, and they are mixed. The mixture (dope) is fed to a casting head appropriately through a filter for dope, and is cast from the casting head on a drum or continuous belt of metal (support). The cast film is dried during one rotation of the support to form a film having self-bearing properties, and the dried film is separated from the support, and then the film is sufficiently dried to be wound.

The dope and the absorber containing solution can be mixed by the use of a static mixer which is mounted in the piping before the casting head, fed to the casting head and cast from the casting head on a metal drum (support). Any solvent can be employed in the solvent casting method so long as the polymer used (e.g., cellulose triacetate) can be dissolved. The solvent may be single solvent or a combination of solvents. Examples of solvents employed in the solvent casting method include aliphatic hydrocarbons such as pentane, hexane, heptane, octane, isooctane and cyclohexane; aromatic hydrocarbons such as benzene, toluene and xylene; chlorinated hydrocarbons such as chloromethane, dichloromethane, carbon tetrachloride and trichloroethane; alcohols such as methanol, ethanol, isopropyl alcohol and n-butyl alcohol; ketones such as acetone, methyl ethyl ketone, and cyclohexanone, and esters such as methyl formate, ethyl formate, methyl acetate and ethyl acetate, or dioxalane.

In the case of employing cellulose triacetate as the polymer, a mixed solvent of dichloromethane and methanol is generally employed. Other solvents such as isopropyl alcohol and n-butyl alcohol can be employed so long as cellulose triacetate is not deposited (e.g., during the procedure of preparing the dope or adding the particles to the dope). A ratio of cellulose triacetate and solvent in the dope is preferably 10:90 to 30:70 by weight (cellulose triacetate:solvent).

In the procedure of preparing the dope or the dispersion, various additives such as a dispersing agent, a fluorescent dye, an antifoamant, a lubricant, an antioxidant, a radical scavenger, an acid scavenger, an inhibitor of fade, and a preservative can be added to the dope or the dispersion. In addition, enhanced durability of the polymer UV filter element to the action of light, heat, moisture, and oxygen in terms of UV light blockage, visible spectrum color, and dimensional stability may be imparted by the addition of chemical stabilizers from the list of hindered amine light stabilizers, hindered phenols, acid scavengers, and UV stabilizers. Combinations of stabilizer technologies may be employed as disclosed in copending, commonly assigned U.S. Ser. No. 10/150,836 filed concurrently herewith (based on U.S. Provisional Application Ser. No. 60/326,854 filed Oct. 3, 2001) and incorporated by reference above.

Hindered amine light stabilizers (HALS compounds) useful in the polymer UV filter elements of this invention are known compounds and include, e.g., 2,2,6,6-tetraalkylpiperidine compounds, or the acid addition salts or complexes with metal compounds thereof, as described in U.S. Pat. No. 4,619,956, columns 5–11, and U.S. Pat. No. 4,839,405, columns 3–5, the disclosures of which are incorporated by reference. Such compounds include those of the following Formula VI:

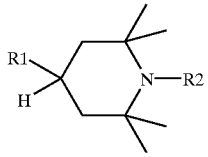

wherein R1 and R2 are H or substituents. Specific examples of hindered amine light stabilizer compounds include 4-hydroxy-2,2,6,6-tetramethylpiperidine; 1-allyl-4-hydroxy-2,2,6,6-tetramethylpiperidine; 1-benzyl-4-hydroxy-2,2,6,6-tetramethylpiperidine; 1-(4-tert-butyl-2-butenyl)-4-hydroxy-2,2,6,6-tetramethylpiperdine; 4-stearoyloxy-2,2,6,6-tetramethylpiperidine; 1-ethyl-4-salicyloyloxy-2,2,6,6-tetramethylpiperidine; 4-methacryloyloxy-1,2,2,6,6-pentamethylpiperidine; 1,2,2,6,6-pentamethylpiperidin-4-yl-beta(3,5-di-tert-butyl-4-hydroxyphenyl)-propionate; 1-benzyl-2,2,6,6-tetramethyl-4-piperidinylmaleinate; (di-2,2,6,6-tetramethylpiperidin-4-yl)-adipate; (di-2,2,6,6-tetramethylpiperidin-4-yl)-sebacate; (di-1,2,3,6-tetramethyl-2,6-diethyl-piperidin-4-yl)-sebacate; (di-1-allyl-2,2,6,6-tetramethyl-piperidin-4-yl)-phthalate; 1-acetyl-2,2,6,6,-tetramethylpiperidin-4-yl-acetate; trimellitic acid-tri-(2,2,6,6-tetramethylpiperidin-4-yl)ester; 1-acryloyl-4-benzyloxy-2,2,6,6-tetramethylpiperdine; dibutyl-malonic acid-di-(1,2,2,6,6-pentamethyl-piperidin-4-yl)-ester; dibenzyl-malonic acid-di-(1,2,3,6-tetramethyl-2,6-diethyl-piperidin-4-yl)-ester; dimethyl-bis-(2,2,6,6-tetramethylpiperidin-4-oxy)-silane; tris-(1-propyl-2,2,6,6,-tetramethylpiperidin-4-yl)-phosphite; tris-(1-propyl-2,2,6,6-tetramethypamethylpiperidin-4-yl)-phosphate; N,N'-bis-(2,2,6,6-tetramethylpiperidin-4-(yl)-hexamethylene-1,6-diamine; N,N'-bis-(2,2,6,6-tetramethylpiperidin-4-yl)-hexamethylene, 1,6-diacetamide; 1-acetyl-4-(N-cyclohexylacetamide)-2,2,6,6-tetramethyl-piperidine; 4-benzylamino-2,2,6,6-tetramethylpiperidine; N,N'-bis-(2,2,6,6,-tetramethylpiperidin-4-yl)-N,N'-dibutyl-adipamide; N,N'-bis-(2,2,6,6-tetramethylpiperidin-4-yl)-N,N'-dicyclohexyl-(2-hydroxypropylene); N,N'-bis-(2,2,6,6-tetramethylpiperidin-4-yl)-p-xylylene-diamine; 4-(bis-2-hydroxyethyl)-amino-1,2,2,6,6-pentamethylpiperidine; 4-methacrylamide-1,2,2,6,6-pentamethylpiperdine; alpha-cyano-beta-methyl-beta-[N-(2,2,6,6-tetramethylpiperidin-4-yl)]-amino-acrylic acid methyl ester.

Hindered phenols antioxidant compounds useful in the polymer UV filter elements of this invention are also known compounds, and include, e.g., 2,6-dialkylphenol derivative compounds such as described in U.S. Pat. No. 4,839,405 columns 12–14, the disclosure of which is incorporated by reference. Such compounds include those of the following Formula VII:

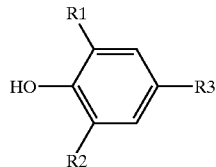

wherein R1, R2 and R3 represent further substituted or unsubstituted alkyl substituents. Specific examples of hindered phenol compounds include n-Octadecyl 3-(3,5-di-t-butyl-4-hydroxyphenyl)-propionate; n-Octadecyl 3-(3,5-di-t-butyl-4-hydroxyphenyl)-acetate; n-Octadecyl 3,5-di-t-butyl-4-hydroxybenzoate; n-Hexyl 3,5-di-t-butyl-4-hydroxyphenylbenzoate; n-Dodecyl 3,5-di-t-butyl-4-hydroxphenylbenzoate; Neo-dodecyl 3-(3,5-di-t-butyl-4-hydroxyphenyl)propionate; Dodecyl beta (3,5-di-t-butyl-4-hydroxyphenyl)propionate; Ethyl alpha-(4-hydroxy-3,5-di-t-butylphenyl)-isobutyrate; Octadecyl alpha-(4-hydroxy-3,5-di-t-butylphenyl)isobutyrate; Octadecyl alpha-(4-hydroxy-3,5-di-t-butyl-4-hydroxyphenyl)propionate; 2-(n-octylthio)ethyl 3,5-di-t-butyl-4-hydroxy-benzoate; 2-(n-octylthio)ethyl 3,5-di-t-butyl-4-hydroxy-phenylacetate; 2-(n-octadecylthio)ethyl 3,5-di-t-butyl-4-hydroxyphenylacetate; 2-(n-octadecylthio)ethyl 3,5-di-t-butyl-4-hydroxy-benzoate; 2-(2-hydroxyethylthio)ethyl 3,5-di-t-butyl-4-hydroxybenzoate; Diethyl glycol bis-(3,5-di-t-butyl-4-hydroxy-phenyl)propionate; 2-(n-octadecylthio) ethyl 3-(3,5-di-t-butyl-4-hydroxyphenyl)propionate; Stearamido N,N-bis-[ethylene 3-(3,5-di-t-butyl-4-hydroxyphenyl)propionate]; n-Butylimino N,N-bis-[ethylene 3-(3,5-di-t-butyl-4-hydroxyphenyl)propionate]; 2-(2-stearoyloxyethylthio)ethyl 3,5-di-t-butyl-4-hydroxybenzoate; 2-(2-stearoyloxyethylthio)ethyl 7-(3-methyl-5-t-butyl-4-hydroxyphenyl)heptanoate; 1,2-propylene glycol bis-[3-(3,5-di-t-butyl-4-hydroxyphenyl)propionate]; Ethylene glycol bis-[3,5-di-t-butyl-4-hydroxyphenyl)propionate]; Neopentylglycol bis-[3-(3,5-di-t-butyl-4-hydroxyphenyl)propionate]; Ethylene glycol bis-[3,5-di-t-butyl-4-hydroxy-phenylacetate); Glycerine-1-n-octadecanoate-2,3-bis-(3,5-di-t-butyl-4-hydroxyphenylacetae); Pentaethylthritol-tetrakis-[3-(3',5'-di-t-butyl-4'-hydroxyphenyl)propionate]; 1,1,1-trimethylol ethane-tris-3-(3,5-di-t-butyl-4-hydroxyphenyl)propionate]; Sorbital hexa-[3-(3,5-di-t-butyl-4-hydroxy-phenyl)propionate]; 2-hydroxyethyl 7-(3-methyl-5-t-butyl-4-hydroxy-phenyl)propionate; 2-stearoyloxyethyl 7-(3 methyl-5-t-butyl-4-hydroxyphenyl)heptanoate; 1,6-n-hexanediol-bis[(3',5'-di-t-butyl-4-hydroxyphenyl) propionate]; pentaerythritol-tetakis(3,5-di-tert-butyl-4-hydroxy hydrocinnamate). Hindered phenolic antioxidant compounds of the above types are available commercially, such as from Ciba Specialty Chemicals under the general trade designations "Irganox 1076" and "Irganox 1010".

Acid scavengers useful in the polymer UV filter elements of this invention, e.g., include epoxy compounds such as those acid accepting epoxy compounds described in U.S. Pat. No. 4,137,201, the disclosure of which is incorporated by reference herein. Such acid accepting epoxy compounds are known to the art and include diglycidyl ethers of various polyglycols, particularly those polyglycols that are derived from condensation of say 8 to 40 moles of ethylene oxide or the like per mole of polyglycol product; diglycidyl ethers of glycerol and the like; metallic epoxy compounds (such as those conventionally utilized in and with vinylchloride polymer compositions); epoxidized ether condensation products; diglycidyl ethers of bisphenol A (i.e., 4,4'-dihydroxy diphenyl dimethyl methane); epoxidized unsaturated fatty acid esters, particularly 4 to 2 carbon atom or so alkyl esters of 2 to 22 carbon atom fatty acids such as butyl epoxy stearate and the like; and various epoxidized long chain fatty acid triglycerides and the like, such as the epoxidized vegetable and other unsaturated natural oils (which are sometimes referred to as being epoxidized natural glycerides or unsaturated fatty acids, which fatty acids generally contain between 12 and 22 carbon atoms) that may be specifically typified and particularized by such compositions as epoxidized soya bean oil. Particularly preferred is commercially available epoxy group containing epoxide resin compound EPON 815c, and other epoxidized ether oligomeric condensation products of Formula VIII

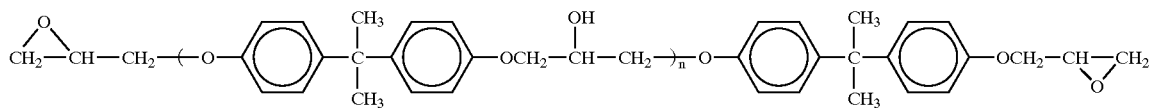

where n equals from 0 to 12. Additional possible acid scavengers, which may be employed, include those described in Japanese Kokai JP 05194788 A2, paragraphs 87–105, the disclosure of which is incorporated by reference.

A ratio of the acid scavenger to the total concentration of hindered amine compound and hindered phenol compound is preferably 10:1 to 1:10 by weight, preferably 4:1 to 1:5 and especially in the range of 2:1 to 1:2. The ratio of hindered amine light stabilizer (HALS) to hindered phenol (HP) preferably lies in the range of 1:20 to 20:1 (HALS:HP) by weight, more preferably in the range of 1:10 to 10:1, and especially in the range of 1:5 to 5:1.

Additional stabilizers disclosed for use in combination with dibenzoylmethane derivatives are suggested, e.g., in U.S. Pat. Nos. 5,783,173; 5,849,273; 5,788,954; 5,993,789; and 6,129,909, which compounds may additionally be employed in the elements of the invention.

In a particularly preferred embodiment, a UV filter element in accordance with the invention comprises a cellulose triacetate film containing from 0.01 to 5 wt % (based on total weight) of a first ultraviolet absorbing dibenzoylmethane compound of formula (I) such as compound I-1 (Parsol 1789) (UV-1), from 0.01 to 5 wt % Tinuvin 326 (UV-3) and from 0.01 to 5 wt % Tinuvin 328 (UV-2) as second UV absorbing compounds, from 0.01 to 10 wt % of a hindered amine light stabilizer compound such as Tinuvin 622 (HALS-1), from 0.01 to 10 wt % of a hindered phenol compound such as Irganox 1010 (HP-1), and from 0.01 to 10 wt % of an epoxy containing acid scavenger compound such as Epon 815c (epoxy group containing oligomeric epoxide resin obtained from monomers of formula E-1), with 0.1–20 wt % of a plasticizer such as triphenylphosphate.

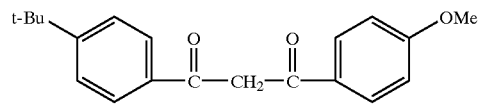
UV-1)

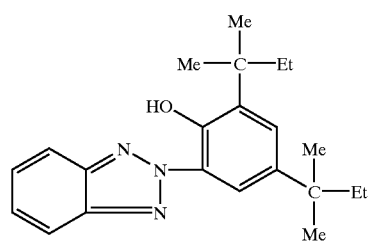
UV-2)

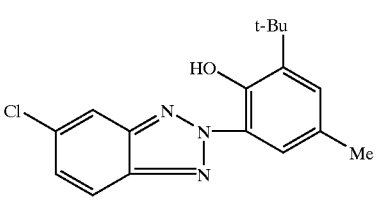
UV-3)

-continued

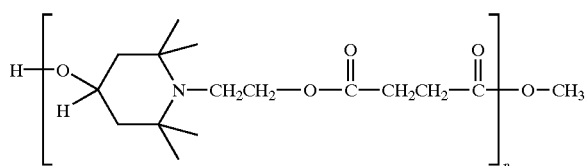
HALS-1)

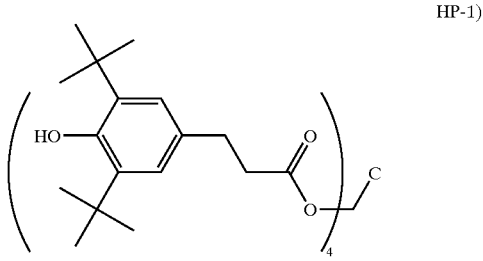
HP-1)

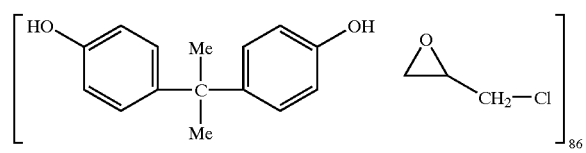
E-1)

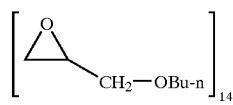

EXAMPLES

Test procedure: The effectiveness of the UV filter elements as described in the examples below were evaluated under initial conditions after preparation of the films. Transmission spectra of the example films were obtained versus an air reference over the wavelength range 220 nm to 800 nm by usual procedures. Determination of the CIE human perception color parameters L*, a*, and b* were made using the D65 illumination standard.

Example 1

In a mixing vessel for a polymer dope, 100 weight parts of cellulose acetate (CTA) (combined acetic acid value: 60.8%), 11.8 weight parts of triphenyl phosphate (TPP), 399 weight parts of dichloromethane and 33.4 weight parts of methanol and 9.3 weight parts of n-butanol were placed, and the cellulose acetate was dissolved by stirring under heating to prepare a dope.

In another mixing vessel, 3.3 weight parts of an ultraviolet absorber (compound of formula UV-1), 27.3 weight parts UV-2, 5.2 weight parts UV-3, 145 weight parts of dichloromethane, 12 weight parts of methanol, and 3.4 weight parts of n-butanol were placed, and the UV absorbers were dissolved by stirring to prepare a solution.

To the CTA dope (302 weight parts), 10 weight parts of the ultraviolet absorber containing solution was added, and they were sufficiently mixed to prepare a uniform solution (dope). The mixed dope was fed to an extrusion die and cast on a moving metal support. After the cast film was separated from the casting surface, the film was dried by passing through a heating zone to prepare a cellulose acetate film having a thickness of 80 μm providing a polymer film suitable for the protective component of a polarizing plate.

Comparison Example 1

The same procedure as in Example 1 was used with the exception that ultraviolet absorber UV-1 was not added. A CTA film was prepared in the same manner.

Example 2

In another mixing vessel, 10.3 weight parts of an ultraviolet absorber (UV-1), 4.6 weight parts UV-4, 5.1 weight parts of HALS-2, having the following structures, 145 weight parts of dichloromethane, 12 weight parts of methanol, and 3.4 weight parts of n-butanol were placed, and the UV absorbers were dissolved by stirring to prepare a solution. The same procedure as in Example 1 for mixing with CTA dope was then used and a CTA film was prepared in the same manner.

The spectral response parameters of the example films are shown in TABLE 1.

TABLE 1

Spectral properties of 80 μm film UV filters.

| Sample ID | % T @ 380 nm | % T @ 550 nm | Cutoff range between 5% and 72% T [nm] | L* | a* | b* |
|---|---|---|---|---|---|---|
| Example 1 | 0.81 | 92.1 | 16.7 | 96.8 | −0.15 | 0.56 |
| Comparison Example 1 | 4.6 | 92.6 | 20.2 | 96.9 | −0.13 | 0.52 |
| Example 2 | 0.27 | 92.2 | 11.6 | 96.9 | −0.07 | 0.41 |

Clearly as seen in TABLE 1, the performance of both Example films containing dibenzoylmethane compounds are superior to Comparison Example 1 in both reduced transmittance at 380 nm and reduced transmittance cutoff range, while maintaining %T at 550 nm and L*a*b* color.

The invention has been described in detail with particular reference to certain preferred embodiments thereof, but it will be understood that variations and modifications can be effected within the spirit and scope of the invention.

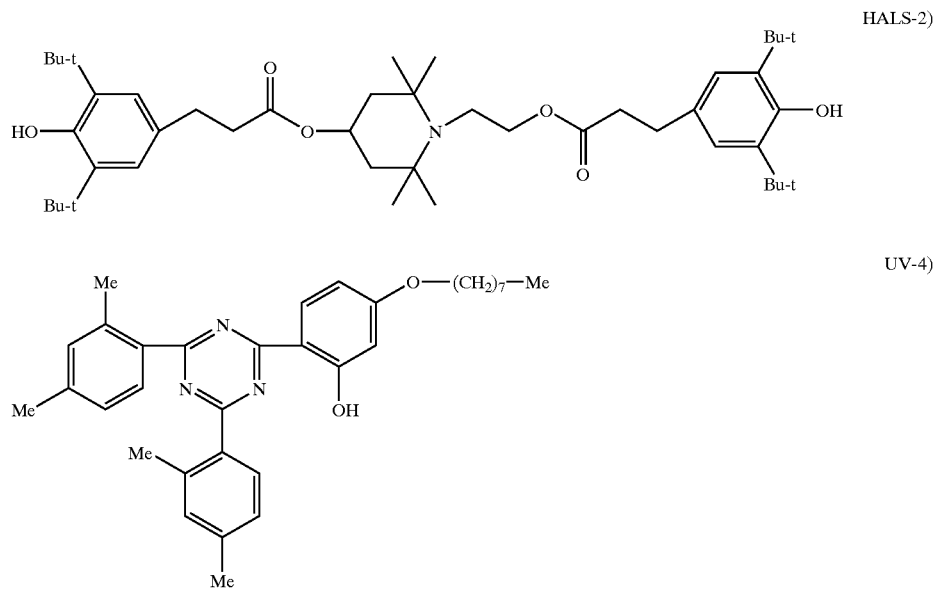

HALS-2)

UV-4)

The transmittance spectra of each of the films from Examples 1 and 2 and Comparison Example 1 are shown in FIG. 1. The transmittance curves for Examples 1 and 2 rise steeply in the vicinity of 395 nm and demonstrate transmittance of less than 1% at 380 nm, less than 20% at 390 nm, and greater than 90% at 420 nm. In contrast, the spectrum of Comparison Example 1 shows a more shallow rise with a transmittance of greater than 4% at 380 nm, greater than 30% at 390 nm, while maintaining greater than 90% at 420 nm. The performance of Comparison Example 1 therefore, does not cut off UV light as sharply and is thus inferior to the films of Examples 1 and 2 as a UV filter element, thus demonstrating the improved performance of dibenzoylmethane (Formula I) containing UV filter elements. As shown for Example 2, addition of a radical scavenger stabilizer (HALS-2) does not impair the transmission spectral response.

What is claimed is:

1. A self-bearing ultraviolet light absorbing polymer film, coating, or molded article UV filter element comprising a cellulose ester polymer phase having molecularly dispersed therein a) a first ultraviolet absorbing dibenzoylmethane compound of formula (I)

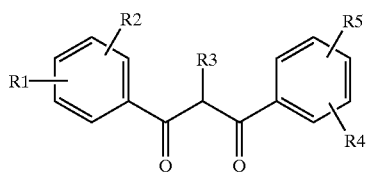

where R1 through R5 are each independently hydrogen, halogen, nitro, or hydroyxl, or further substituted or unsubstituted alkyl, alkenyl, aryl, alkoxy, acyloxy, ester, carboxy, alkyl thio, aryl thio, alkyl amine, aryl amine, alkyl nitrile, aryl nitrile, arylsulfonyl, or 5–6 member heterocycle ring groups, wherein each of R1 through R5 comprises 20 or fewer carbon atoms, and b) a second ultraviolet light absorbing compound which absorbs ultraviolet light at a wavelength for which the first compound is deficient at absorbing.

2. An element according to claim 1 comprising a cellulose ester film.

3. An element according to claim 2, wherein the second ultraviolet light absorbing compound comprises a hydroxyphenyl-s-triazine, hydroxyphenylbenzotriazole, formamidine, benzoxazinone, or benzophenone compound.

4. An ultraviolet light absorbing cellulose ester film UV filter element comprising a polymer phase having molecularly dispersed therein a) a first ultraviolet absorbing dibenzoylmethane compound of formula (I)

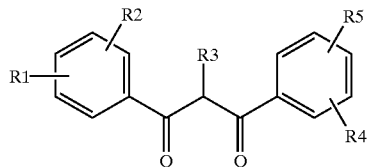

where R1 through R5 are each independently hydrogen, halogen, nitro, or hydroyxl, or further substituted or unsubstituted alkyl, alkenyl, aryl, alkoxy, acyloxy, ester, carboxy, alkyl thio, aryl thio, alkyl amine, aryl amine, alkyl nitrile, aryl nitrile, arylsulfonyl, or 5–6 member heterocycle ring groups, and b) a second ultraviolet light absorbing compound which absorbs ultraviolet light at a wavelength for which the first compound is deficient at absorbing, wherein the second light absorbing compound comprises a hydroxyphenyl-s-triazine or hydroxyphenylbenzotriazole compound.

5. An element according to claim 4, wherein the second light absorbing compound comprises a hydroxyphenyl-s-triazine compound.

6. An element according to claim 4, wherein the second light absorbing compound comprises a hydroxyphenylbenzotriazole compound.

7. An element according to claim 2 providing a transmittance at a wavelength of 380 nm of not more than 10% and at 390 nm of not more than 25%, and a transmittance at a wavelength of 400 nm of not less than 55% and at 420 nm of not less than 85%.

8. An element according to claim 7, which provides a transmittance at 370 nm of not more than 1%.

9. An element according to claim 8 providing a transmittance at a wavelength of 380 nm of not more than 5% and at 390 nm of not more than 20%.

10. An element according to claim 9 providing a transmittance at a wavelength of 400 nm of not less than 60% and at 420 nm of not less than 90%.

11. An element according to claim 10 which shows transmittance of at least 90% throughout the visible wavelength range of 420 to 750 nm.

12. An element according to claim 2, wherein the first ultraviolet absorbing dibenzoylmethane compound is of Formula I-A:

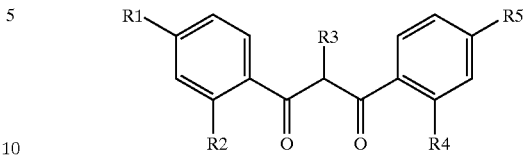

where R1 and R5 represent alkyl or alkoxy groups of from 1–6 carbon atoms and R2 through R4 represent hydrogen atoms.

13. An element according to claim 1, wherein the second ultraviolet light absorbing compound comprises a hydroxyphenyl-s-triazine, hydroxyphenylbenzotriazole, formamidine, benzoxazinone, or benzophenone compound.

14. An element according to claim 13 providing a transmittance at a wavelength of 380 nm of not more than 10% and at 390 nm of not more than 25%, and a transmittance at a wavelength of 400 nm of not less than 55% and at 420 nm of not less than 85%.

15. An element according to claim 14, which provides a transmittance at 370 nm of not more than 1%.

16. An element according to claim 14 providing a transmittance at a wavelength of 380 nm of not more than 5% and at 390 nm of not more than 20%.

17. An element according to claim 16 providing a transmittance at a wavelength of 400 nm of not less than 60% and at 420 nm of not less than 90%.

18. An element according to claim 17 which shows transmittance of at least 90% throughout the visible wavelength range of 420 to 750 nm.

19. A liquid crystal display polarizer comprising a protective film comprising an ultraviolet light absorbing polymer cellulose ester film UV filter element comprising a polymer phase having molecularly dispersed therein a) a first ultraviolet absorbing dibenzoylmethane compound of formula (I)

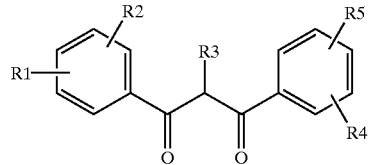

where R1 through R5 are each independently hydrogen, halogen, nitro, or hydroyxl, or further substituted or unsubstituted alkyl, alkenyl, aryl, alkoxy, acyloxy, ester, carboxy, alkyl thio, aryl thio, alkyl amine, aryl amine, alkyl nitrile, aryl nitrile, arylsulfonyl, or 5–6 member heterocycle ring groups, and b) a second ultraviolet light absorbing compound which absorbs ultraviolet light at a wavelength for which the first compound is deficient at absorbing.

20. A polarizer according to claim 19, wherein the second light absorbing compound in the cellulose ester film element comprises a hydroxyphenyl-s-triazine or hydroxyphenylbenzotriazole compound.

* * * * *